May 9, 1967

C. E. BARKALOW ETAL 3,318,161

CONTROL SYSTEM FOR GYRO-VERTICALS

Original Filed May 5, 1960

INVENTORS
CLARE E. BARKALOW
HENRY C. DAUBERT JR.

BY *Price & Heneveld*

ATTORNEYS

INVENTORS
CLARE E. BARKALOW
HENRY C. DAUBERT JR.
BY
ATTORNEYS 3,318,161
CONTROL SYSTEM FOR GYRO-VERTICALS
Clare E. Barkalow, Comstock Park, and Henry C. Daubert, Jr., Grand Rapids, Mich., assignors to Lear Siegler, Inc.
Original application May 5, 1960, Ser. No. 26,997, now Patent No. 3,167,763, dated Jan. 26, 1965. Divided and this application Apr. 23, 1964, Ser. No. 362,041
9 Claims. (Cl. 74—5.34)

This invention relates to a control system for gyro-verticals for vehicles, particularly aircraft. More specifically it relates to a novel erection system for a displacement gyroscope having its gyro axis normally vertically oriented and its gimbals arranged normally parallel with the roll and pitch axis of a vehicle.

This application is a division of United States Patent Application Ser. No. 26,997, filed May 5, 1960, entitled, "Vertical Sensor," now United States Patent No. 3,167,-763 issued Jan. 26, 1965.

Various systems have been proposed for controlling gyro-verticals and particularly for erecting the gyro-verticals by means of so-called gyro-compensated pendulums. The history of the development of such controls is taught in four United States Patents, namely, U.S. Patents Nos. 1,880,994, 2,595,263, 2,608,867 and 2,685,207. Patent No. 1,880,994 is the first patent to teach a pendulous rate gyro. This gyro operatively associated a pendulum with the gimbal on which the rotor was mounted. The purpose of this construction was to properly orient the gimbal with respect to the earth's surface regardless of the attitude of the vehicle on which it was mounted.

Patent No. 2,595,268 discloses an improved gyroscopic apparatus having means for compensating the adverse effects of the changes in velocity or acceleration of the vehicle. Patent No. 2,608,867 took one step forward in providing an auxiliary pendulous gyroscope which was used in combination with a gyro-vertical for erecting the same. This device, however, has run into many problems involving damping, transmission and the like which were attempted to be solved by the device of Patent No. 2,685,207. In this patented device the pendulum control, that is the gyro-compensated pendulum, is mounted in a piggy-back fashion on the gyro-vertical itself.

To my knowledge this device of Patent No. 2,685,207 has met with no commercial success probably because of the complications in production, particularly as related to so-called "packaging." That is, the designing and arrangement are such that the components cannot be made into a compact unit which can feasibly be incorporated in a gyro-controlled system. Further, in this device of Patent No. 2,685,207 the gyro-compensated pendulum and the gyro-vertical are gyroscopically coupled, producing errors which the present invention eliminates.

The present invention is a novel and patentable improvement of the apparatus disclosed in the above mentioned patents. This apparatus avoids the problems inherent in the patented structures while at the same time providing many other advantages.

According to my invention, I maintain the same relative positions of the gimbals in the gyro-compensated pendulum and the gyro-vertical so that the gyro-compensated pendulum is subjected to the same static and dynamic forces as the gyro-vertical resulting in the gyro-compensated pendulum being able to more accurately erect the gyro-vertical and thereby maintain it in proper orientation with respect to the earth.

This objective is accomplished by mounting the gyro-compensated pendulum on a stable platform which is slaved and stabilized by servo means to repeat the relative position of the gyro-vertical. More specifically, I provide an auxiliary platform having inner and outer gimbals operatively associated with the gimbals of the gyro-vertical so that the relative positions of the gimbals of the gyro-compensated pendulum and the gyro-vertical gimbals are maintained. This construction eliminates many of the problems of the patented structures to which we previously referred, and also has other substantial advantages.

In order to understand our invention in its entirety, reference is made to the drawings wherein.

Figure 1:
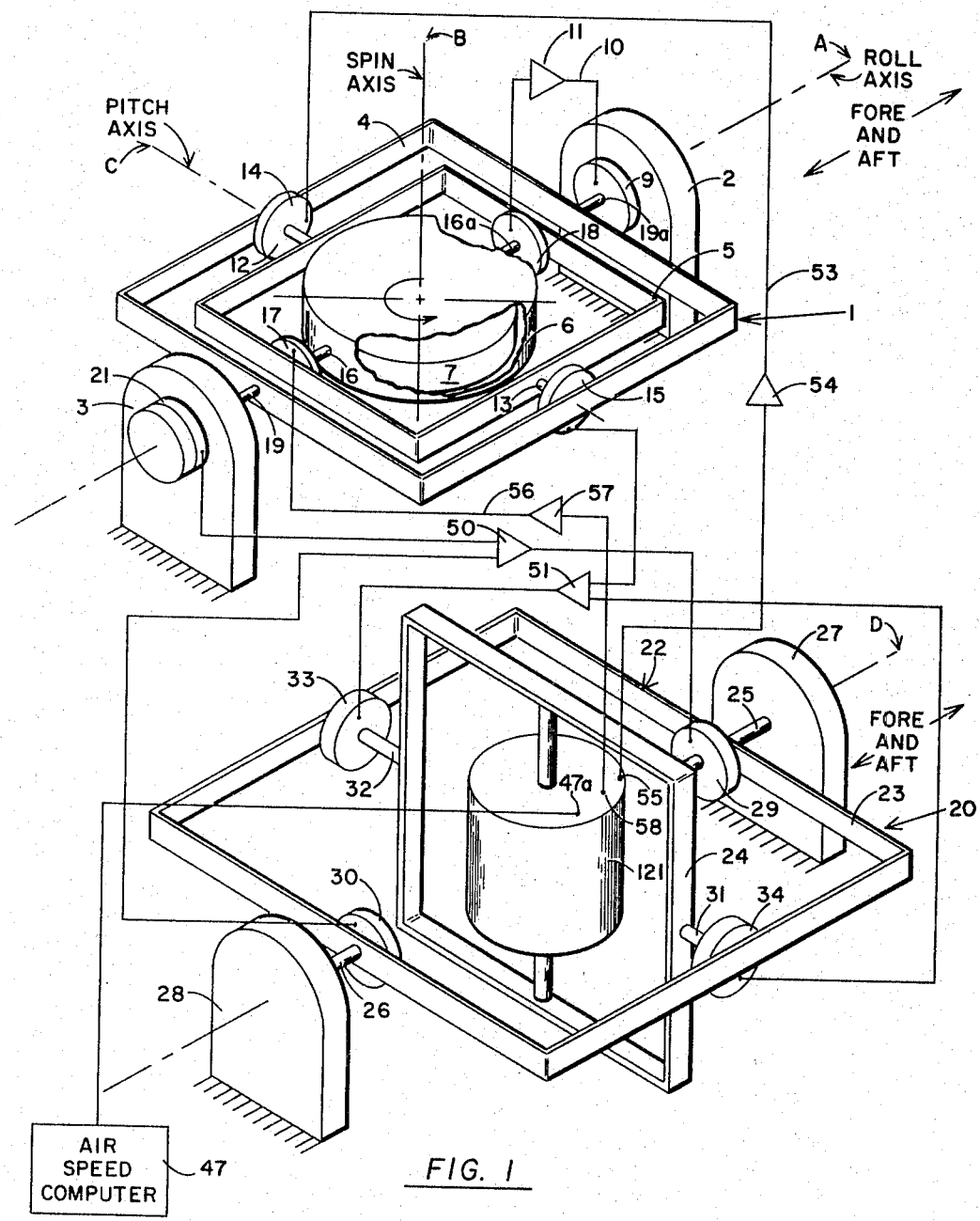
FIG. 1 shows a schematic perspective drawing of my invention.

In FIG. 1, reference numeral 1 designates a vertical gyroscope or gyro-vertical which is gimbal-mounted on the support members 2 and 3 of a vehicle such as an aircraft. The supports 2 and 3 are aligned along a horizontal axis A which is parallel or coincident with the roll axis of the aircraft.

The gyro-vertical is of the type which includes a redundant gimbal 4, the intermediate gimbal 5 and the innermost gimbal or rotor case 6 in which is rotatably mounted the rotor 7. The rotor 7 is rotatably mounted about the spin axis B running longitudinally of the vertical rotor case 6.

It will be noted that the redundant gimbal 4 is mounted on the supports 2 and 3 by shafts 19 and 19a. As is well known for redundant gimbals of this type, which are generally provided for aircraft doing all-attitude maneuvers, the redundant gimbal 4 is servo positioned by the relative positions of the inner and intermediate gimbals. This is accomplished by providing a servo 9 controlled by signals from an angular pick-off 18, which signals are created when any relative movement between the inner gimbal or rotor case 6 and the intermediate gimbal 5 is experienced. Signals from the angular pick-off 36 are fed through a closed servo loop 10 which utilizes a summing amplifier 11 all in a well-known manner.

The intermediate gimbal 5 is rotatably mounted by means of shafts 12 and 13 on the redundant gimbal 4. The shafts are normally rotated about the horizontal axis C which is parallel or coincident with the pitch axis of the aircraft. Located on the shaft 12 is the roll erecting torquer 14 and on the shaft 13 is the angular pick-off 15 which detects the degree of pitch.

The inner gimbal or rotor case 6 is rotatably mounted on the intermediate gimbal 5 by means of the shafts 16 and 16a. Located at shaft 16 is the pitch erecting torquer 17 and located at shaft 16a is the angular pick-off 18 which detects relative movement betwen the inner gimbal 6 and intermediate gimbal 5. The rotor 7 is rotatably mounted and driven within the rotor case in a well-known conventional manner.

It will be noted that on the support 3 is an angular pick-off 21 which is directly connected to the shaft 19 of the redundant gimbal 4. This angular pick-off 21 detects the degree of roll of the redundant gimbal and thus the degree of roll of the entire vehicle relative to the vertical gyro.

Reference numeral 20 designates the gyro-compensated pendulum control unit which includes a gyro-compensated pendulum 121 mounted on a servo positioned platform 22 which is slaved and stabilized by servo means to repeat the relative positions of the gimbals of the gyro-vertical just described. This is accomplished by providing an outer gimbal 23 and an inner gimbal 24. Outer gimbal 23 is supported on shafts 25 and 26 on the supports 27 and 28 which are rigidly secured to the aircraft and form a part thereof. The shafts 25 and 26 are located on a horizontal axis D which is parallel or coincident with the roll axis of the aircraft. Thus, the axes A and D are either parallel or coincident. Located at the shaft 25 is the servo or torquer 29 and at the shaft 26 is the angular pick-off 30.

The inner gimbal 24 is mounted on the outer gimbal 23 by means of shafts 31 and 32. Torquer 33 is located at shaft 32 for applying a torque to the inner gimbal 24 and angular pick-off 34 is provided at the shaft 31 for purposes which will be described hereinafter.

Figure 2:
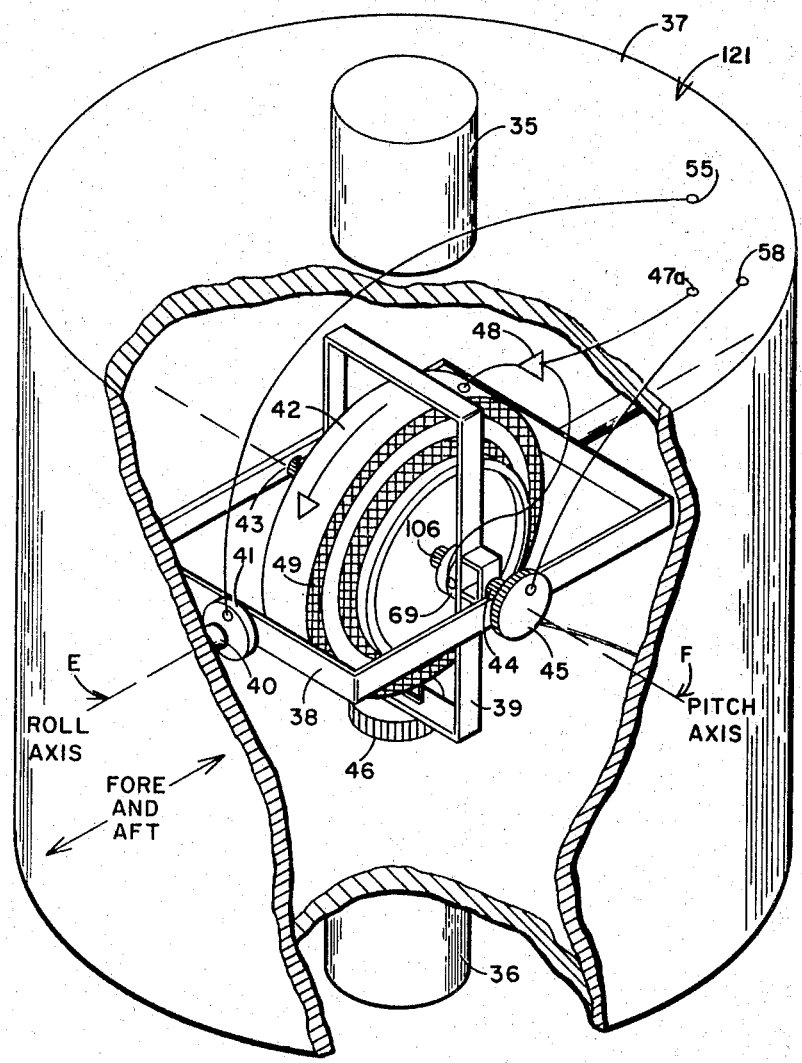
FIG. 2 is a view, partially in section and partially in profile, of the gyro-compensated pendulum portion of the device shown in FIG. 1.

The gyro-compensated pendulum or so-called "control pendulum" is shown in more detail in FIG. 2. This control pendulum includes the shafts 35 and 36 rigidly connected to the inner gimbal and supporting the housing 37 in which is contained or housed another set of gimbals including the outer gimbal 38 and the inner gimbal 39. The housing 37 supports the outer gimbal 38 in a substantially frictionless manner on a normally horizontal axis E by means of shaft 40 and another shaft (not shown). Axis E is shown normally parallel or coincident with the true air speed vector of the aircraft although this is not essential. A sensor 41 is mounted on shaft 40 and as will be described hereinafter provides signals which are fed to roll erecting torquer 14 for erecting the inner gimbal of the gyro-vertical. The inner gimbal 39 which supports the rotor 42 is supported on the outer gimbal 38 in a substantially frictionless manner by means of the shafts 43 and 44. Another sensor 45 is provided at shaft 44 to detect the position of the inner gimbal and create signals which are fed to the pitch erecting torquer 17 for erecting the intermediate gimbal of the gyro-vertical as will be explained in more detail hereinafter.

The inner gimbal 39 which supports the rotor 42 has connected at its lower end a pendulum weight 46. This pendulum weight in a well-known manner has the effect of tending to maintain the gimbals in the same relative position with respect to the earth's surface. The rotor 42 operates to correct errors due to the effect of accelerations both when the aircraft is turning about its vertical axis or changing speed along its fore and aft axis. When the aircraft is turning about a vertical axis the centrifugal force on the pendulum weight 46 tends to tip the gimbal 38 out of its normally horizontal plane. This produces just sufficient torque to precess the rotor 42 about a vertical axis at the same rate that the airplane is turning for a predetermined air speed. In other words, the tendency of the gyro or rotor 42 to precess during a turn is opposed by an equal and opposite centrifugal force acting on the pendulum weight 46 which would otherwise cause it to swing out to the apparent vertical. When the aircraft is accelerated or decelerated along its fore and aft axis, the pendulum weight 46 tends to swing about the axis of the shafts 43 and 44. In order to correct this error, the air speed computer 47, which is adapted to generate an electrical signal proportional to the speed of the aircraft relative to its surrounding air mass, is provided. The electrical output of the air speed computer 47 is connected through terminal 47a and amplifier 48 to stator windings 49 to drive rotor 42 at an angular velocity which is linearly proportional to the horizontal velocity as determined by the output of the air speed computer 47. The speed of rotor 42 is controlled by means of a signal generator 69 mounted near shaft 106 and connected through amplifier 48 to create a closed servo loop. The torques thus created to alter the rotor speed actually compensate for the effects of speed changes of the aircraft which would otherwise disturb the pendulum position.

It should be understood that the gyro-compensated pendulum just described is very similar to the gyro-compensated pendulum disclosed in the previously mentioned Patent No. 2,608,867. The concept of this invention is to mount this conventional gyro-compensated pendulum on a stable platform which is slaved and stabilized to repeat the relative position of the gimbals of the gyro-vertical. This slaving of the stable platform 22 to the redundant gimbals 4 and 5 is illustrated by FIG. 1.

The slaving of the outer gimbal 23 of platform 22 to the redundant gimbal 4 is accomplished by means of the angular pick-off 21, the servo motor 29 and the angular pick-off which are all connected to the substracting amplifier 50. When the signals from the pick-offs 21 and 30, which are fed to the subtracting amplifier 50, are equal there is a null and no signal is fed to the servo motor 29. However, an unbalance in the signals from the two pick-offs results in a signal being fed to the servo motor 29 which correspondingly moves the outer gimbal 23 so as to position the gyro-compensated pendulum in the same relative position with respect to the roll axis of the aircraft.

The inner gimbal 24 which positions the gyro-compensated pendulum in the same relative position as the gyro-vertical with respect to the pitch axis is accomplished by means of the angular pick-off 15, servo motor 33, and angular pick-off 34 all of which are electrically connected to the subtracting amplifier 51. If the signals from the pick-offs 15 and 34 are equal, no signal will be present on the servo motor 33. Whereas, if there is an unbalance in the signals from the pick-offs 15 and 34 a corresponding signal will appear at the servo motor 33 causing it to appropriately move the inner gimbal 24. It should be understood that conventional three-wire servo-followup systems can be substituted for the subtracting amplifier system as shown.

The connections of the gyro-compensated pendulum to the gyro-vertical for erecting the same is as follows. The roll erecting torquer 14 is electrically connected to sensor 41 (FIG. 2) by means of line 53 through the amplifier 54 and the connection point 55. Thus, a signal created by sensor 41 in response to the roll of the aircraft will produce a corresponding signal on torquer 14 which properly erects the gyro-vertical about its roll axis.

The pitch erecting torquer 17 is connected by line 56 through amplifier 57 and connection point 58 to sensor 45 (FIG. 2). Thus, when the aircraft is pitched a signal created by sensor 45 produces a corresponding signal on pitch erecting torquer 17 causing it to properly erect the gyro-vertical about its pitch axis.

OPERATION

Having described my invention in detail, the operation should be evident. Assuming the aircraft is on level flight the redundant gimbal 4 is in horizontal position with respect to the earth's surface and also in parallel relationship to the wing of the aircraft. In this position the outer gimbal 23 of the gyro-compensated pendulum control unit also is in this exact relationship to the earth and the wings of the aircraft. Now if the wings of the aircraft are tipped the redundant gimbal is maintained in the same relative position to the earth's surface but is at an angle to the aircraft wings by reason of tipping about the roll axis A. The outer gimbal 23 of platform 22 by means of the servo motor 29 is moved to the same relative position as the redundant gimbal 4 by reason of the outer gimbal 23 being slaved to the redundant gimbal 4. Thus, regardless of any amount of relative movement between the redundant gimbal 4 and the aircraft, relative to the roll axis, the outer gimbal 23 of the platform 22 will follow or repeat this same position.

This slaving action is also true of the inner gimbal 24 of platform 22 with respect to the intermediate gimbal 5 of the gyro-vertical despite the fact that the frame of gimbal 24 lies on a plane normal to the plane of the frame of gimbal 5. In other words, as the aircraft is pitched, the relative position of gimbal 5 with respect to the aircraft will change and because the inner gimbal 24 of platform 22 is slaved to the intermediate gimbal 5 the same relative change in position of the inner gimbal 24 will result.

Since the gyro-compensated pendulum is mounted on the platform 22, it will exactly repeat the movement of the vertical gyro with respect to the aircraft. Thus, the gyro-compensated pendulum will have the same relative orientation with respect to the aircraft as the gyro-vertical and will be subjected to the same static and dynamic forces as the gyro-vertical.

As previously described, the gyro-compensated pendulum is utilized to erect the gyro-vertical in a well-known manner. Thus, the gyro-compensated pendulum provides a gravity reference for the gyro-vertical. Also, the control pendulum 121 is compensated for errors due to acceleration both when the aircraft is turning about its vertical axis or changing speed along its fore and aft axis. As previously described, this is accomplished by the air speed computer 47 which generates an electrical signal proportional to the speed of the aircraft relative to its surrounding air mass. This signal is impressed on the stator winding of the rotor 42 so as to vary the speed of the rotor to compensate for accelerations in the fore and aft directions, and provide the proper gyro speed to compensate also for turning acceleration.

The present invention has solved the problems inherent in the structures of Patents Nos. 2,608,867 and 2,685,207. It eliminates errors resulting from the spin axis of the rotor of the control pendulum becoming inclined more than a few degrees. It eliminates any damping problems inherent in the structure of Patent 2,608,867 which requires damping because of the large angular freedom of the pendulum control. It provides an earth stable structure to damp against. In other words, the present invention permits damping with the earth as a reference rather than with the aircraft as a reference, thus eliminating the need of costly damping motors as is shown by Patent No. 2,608,867. It eliminates any errors resulting from the gyroscopic coupling between the gyros of the gyro-vertical and the gyro-compensated pendulum which are inherent in the patented device of 2,685,207. This invention also simplifies the so-called "packaging"; that is, the designing and arrangement of the components into a compact unit which can be feasibly incorporated into a gyro control system. Further, our invention has the added advantage of being adaptable for use with existing gyro-verticals to improve their performance.

It should be understood that although we have described this invention with relation to a gyro-vertical having a redundant gimbal, this invention is equally applicable to the conventional type of gyro-vertical without a redundant gimbal. In such a case it should be understood that the platform outer and inner gimbal axes would correspond respectively with the outer and inner gyro-vertical gimbal axes as regards positioning in the aircraft and as regards the servo positioning follow-up.

Although we have described a preferred embodiment of our invention, it should be understood that this invention is not limited to the exact details of the embodiment as described and that all devices coming within the spirit of this invention are to be covered by this patent unless the claims expressly state otherwise.

We claim:

1. In a means for preventing errors in gyro-verticals for craft, the combination comprising: a displacement gyroscope with its gyro axis normally vertically oriented; a gyro-compensated pendulum operatively connected to said displacement gyroscope for erecting said displacement gyroscope; a stable servo platform means; said gyro-compensated pendulum being mounted on said stable servo platform means in a predetermined relative position with respect to said displacement gyroscope; said stable servo platform means being movably mounted for movement to different positions so as to maintain the same relative position of said displacement gyroscope and said gyro-compensated pendulum, and servo mechanisms operatively connected to said displacement gyroscope and said stable servo platform means and adapted to cause said movement of said stable servo platform means simultaneously with movement of said displacement gyroscope, whereby the relative position of said gyro-compensated pendulum to said displacement gyroscope is maintained.

2. In a means for preventing errors in gyro-verticals for vehicles having normal roll and pitch axes, the combination comprising: a displacement gyroscope having gimbals with axes arranged normally parallel with the roll and pitch axes of the vehicle: a gyro-compensated pendulum means operatively connected to said gimbals of said displacement gyroscope for erecting the same; a stable servo platform means including gimbals having axes parallel with the roll and pitch axes and slaved and stabilized by servo means to repeat the relative positions of the displacement gyroscope gimbals; said gyro-compensated pendulum means being mounted on the innermost gimbal of said stable servo platform means.

3. An erecting means for a vertical gyro comprising: a stable servo paltform means including inner and outer gimbals and means for supporting said gimbals on a vehicle having normal roll and pitch axes; a gyro-compensated pendulum means mounted within said inner gimbal; said pendulum means including a first gimbal supported for free swinging within said inner gimbal about a normally horizontal axis, a second gimbal supported by said first gimbal for free swinging movement about a normally horizontal axis, said second gimbal rotatably supporting a driven rotor, means whereby said second gimbal is made pendulous, and sensor means for sensing the relative position of said second gimbal with respect to said stable servo platform and creating signals for use in erecting the vertical gyro; and said stable servo platform means also including a servo means adapted for operable connection to a second sensor means associated with the gimbals of the vertical gyro whereby the gimbals of said stable servo platform means can be made to repeat the relative positions of the vertical gyro gimbals.

4. An erecting means for vertical gyros comprising: a stable servo platform means including inner and outer gimbals and means for supporting said gimbals on a vehicle having normal roll and pitch axes; a gyro-compensated pendulum means mounted within said inner gimbal; and said stable servo platform means also including a servo means adapted for operable connection to a sensor means associated with the gimbals of a vertical gyro whereby the gimbals of said stable servo platform means can be made to repeat the relative positions of the vertical gyro gimbals.

5. In a means for preventing errors in gyro-verticals for vehicles having normal roll and pitch axes, the combination comprising: a displacement gyroscope having inner and outer gimbals with axes arranged normally parallel with the roll and pitch axes of the vehicle; a gyro-compensated pendulum means operatively connected to said gimbals of said displacement gyroscope for erecting the same; a stable servo platform means including inner and outer gimbals having axes parallel with the roll and pitch axes and slaved and stabilized by servo means to repeat the relative positions of this displacement gyroscope gimbals; said gyro-compensated pendulum means being mounted on the innermost gimbal of said stable servo platform means.

6. A combination vertical gyro and gyro-compensated pendulum erecting means comprising: a stable servo platform means including inner and outer gimbals and means for supporting said gimbals on a vehicle having normal roll and pitch axes; a gyro-compensated pendulum means mounted within said inner gimbal; said pendulum means including a first gimbal, a second gimbal supported by said first gimbal for free swinging movement about a normally horizontal axis, said second gimbal rotatably supporting a driven rotor, means whereby said second gimbal is made pendulous, and sensor means for sensing the relative position of said second gimbal and creating a signal for use in erecting a vertical gyro; a vertical gyro operatively connected to said sensor means and having gimbals with position sensor means; said stable servo platform means also including a servo means operably connected to said position sensor means of the gimbals of said vertical gyro whereby the gimbals of said stable platform means are made to repeat the relative positions of the vertical gyro gimbals.

7. In a means for preventing errors in gyro-verticals for craft, the combination comprising: a displacement gyroscope with its gyro axis normally vertically oriented; a gyro-compensated pendulum operatively connected to said displacement gyroscope for erecting said displacement gyroscope; a stable platform means; said gyro-compensated pendulum being mounted on said stable platform means in a predetermined relative position with respect to said displacement gyroscope; said stable platform means being movably mounted for movement to different positions so as to maintain the same relative position of said displacement gyroscope and said gyro-compensated pendulum, and means operatively connected to said displacement gyroscope and said stable platform means and adapted to cause said movement of said stable platform means simultaneously with movement of said displacement gyroscope, whereby the relative position of said gyro-compensated pendulum to said displacement gyroscope is maintained.

8. In a means for preventing errors in gyro-verticals for vehicles having normal roll and pitch axes, the combination comprising: a displacement gyroscope having inner and outer gimbals with axes arranged normally parallel with the roll and pitch axes of the vehicle; a gyro-compensated pendulum means operatively connected to said gimbals of said displacement gyroscope for erecting the same; a stable platform means including inner and outer gimbals having axes parallel with the roll and pitch axes and slaved and stabilized by means to repeat the relative positions of the displacement gyroscope gimbals; said gyro-compensated pendulum means being mounted on the innermost gimbal of said stable platform means.

9. An erecting means for a vertical gyro comprising: a stable platform means including inner and outer gimbals and means for supporting said gimbals on a vehicle having normal roll and pitch axes; a gyro-compensated pendulum means mounted within said inner gimbal; said pendulum means including a first gimbal supported for free swinging within said inner gimbal about a normally horizontal axis, a second gimbal supported by said first gimbal for free swinging movement about a normally horizontal axis, said second gimbal rotatably supporting a driven rotor, means whereby said second gimbal is made pendulous, and sensor means for sensing the relative position of said second gimbal with respect to said stable platform and creating signals for use in erecting the vertical gyro; said stable platform means being operably connected to the gimbals of the vertical gyro whereby the gimbals of said stable platform means are made to repeat the relative positions of the vertical gyro gimbals.

References Cited by the Examiner
UNITED STATES PATENTS 2,608,867 9/1952 Kellogg et al. _____ 74—5.34
3,069,912 12/1962 Faux et al. _____ 74—5.34
3,075,729 1/1963 Noxon _____ 74—5.34 X FRED C. MATTERN, JR., *Primary Examiner.*

PALMER W. SULLIVAN, *Examiner.*